United States Patent
Dansie

(10) Patent No.: US 10,573,945 B2
(45) Date of Patent: Feb. 25, 2020

(54) METAL-AIR FUEL CELL

(71) Applicant: Hydra Light International Ltd, Melbourne (AU)

(72) Inventor: Mark Dansie, Melbourne (AU)

(73) Assignee: HYDRA LIGHT INTERNATIONAL LTD, Melbourne (AU)

(*) Notice: Subject to any disclaimer, the term of this patent is extended or adjusted under 35 U.S.C. 154(b) by 97 days.

(21) Appl. No.: 15/839,284

(22) Filed: Dec. 12, 2017

(65) Prior Publication Data

US 2018/0183121 A1 Jun. 28, 2018

Related U.S. Application Data

(60) Provisional application No. 62/456,910, filed on Feb. 9, 2017.

(30) Foreign Application Priority Data

Dec. 22, 2016 (AU) ................ 2016905322

(51) Int. Cl.
| | |
|---|---|
| *H01M 12/06* | (2006.01) |
| *H01M 12/02* | (2006.01) |
| *H01M 4/62* | (2006.01) |
| *H01M 4/90* | (2006.01) |
| *C08L 27/18* | (2006.01) |
| *H01M 4/02* | (2006.01) |

(52) U.S. Cl.
CPC ........... *H01M 12/06* (2013.01); *H01M 4/622* (2013.01); *H01M 4/9041* (2013.01); *H01M 12/02* (2013.01); *C08L 27/18* (2013.01); *H01M 2004/027* (2013.01); *H01M 2250/30* (2013.01)

(58) Field of Classification Search
None
See application file for complete search history.

(56) References Cited

U.S. PATENT DOCUMENTS

| | | | |
|---|---|---|---|
| 5,432,022 A | 7/1995 | Cheiky | |
| 8,722,257 B2* | 5/2014 | Eom | ............. H01M 12/06 429/407 |
| 9,768,472 B2* | 9/2017 | Friesen | ............. H01M 12/06 |
| 2005/0112458 A1* | 5/2005 | Dopp | ............. H01M 2/02 429/174 |
| 2010/0323249 A1* | 12/2010 | Fujiwara | ............. C25B 9/10 429/403 |
| 2011/0059364 A1* | 3/2011 | Zhang | ............. H01M 4/0404 429/231.8 |
| 2014/0147755 A1* | 5/2014 | Hirose | ............. H01M 4/8663 429/405 |

(Continued)

FOREIGN PATENT DOCUMENTS

EP 0940870 A2 9/1999

OTHER PUBLICATIONS

International Type Search (ITS) report issued for Australian Provisional Patent Application No. 2016905322, dated Oct. 5, 2017, 11 pages.

*Primary Examiner* — Scott J. Chmielecki
(74) *Attorney, Agent, or Firm* — McDonnell Boehnen Hulbert & Berghoff LLP

(57) ABSTRACT

The application relates to a metal-air fuel cell and uses thereof including use as a long-life, mechanically rechargeable, direct current power source for devices and products.

20 Claims, 10 Drawing Sheets

(56) References Cited

U.S. PATENT DOCUMENTS

| | | | |
|---|---|---|---|
| 2015/0104718 A1* | 4/2015 | Chen | H01M 4/38 |
| | | | 429/403 |
| 2015/0333384 A1* | 11/2015 | Lee | H01M 10/0468 |
| | | | 429/405 |
| 2016/0079614 A1* | 3/2016 | Park | H01M 12/06 |
| | | | 429/407 |
| 2017/0077524 A1* | 3/2017 | Suyama | H01M 12/06 |
| 2017/0092958 A1* | 3/2017 | Zimmerman | H01M 4/24 |

* cited by examiner

METAL-AIR FUEL CELL

CROSS-REFERENCE TO RELATED APPLICATIONS

This application claims priority to U.S. Provisional Application No. 62/456,910, filed Feb. 9, 2017, and Australian Provisional Application No. 2016905322, filed Dec. 22, 2016, each of which is incorporated by reference herein in its entirety.

FIELD

The present invention relates to a metal-air fuel cell and uses thereof including use as a long-life, mechanically rechargeable, direct-current power source for devices and products.

BACKGROUND

The reference in this specification to any prior publication, or information derived from it, or to any matter which is known, is not, and should not be taken as an acknowledgement or admission or any form of suggestion that the prior publication, or information derived from it, or known matter forms part of the common general knowledge in the field of endeavour to which this specification relates.

Many products, in particular household and portable devices are designed to be powered by batteries, such as AA-cell, C-cell and D-cell batteries. Disadvantages when using such traditional batteries include: relatively short operational lifetime and limited shelf-life i.e. expiry due to degradation of the internal (closed system) components over time even when not in use. These devices are therefore also alternatively powered by other sources, including solar power or kerosene.

Disadvantages of using kerosene as an alternative power source include: high monthly costs; environmental pollutant (millions of tonnes of $CO_2$ and black carbon released into the atmosphere contributing to global warming); adverse impact on health (e.g. lungs, eyes, skin and general wellbeing); potential fire hazard (due to flammability); safe storage and regular purchase issues; not suitable as a power source for some products and devices (such as emergency beacons, radios, communications equipment and recharging docks for USB devices); and even the potential for poisoning caused by accidental drinking due to confusion as a beverage.

Disadvantages of using solar energy as an alternative power source include: variability in amount and duration of sunshine (particularly during winter); impact of rain (which can reduce solar potential to near zero during tropical rainy/monsoonal season); cloudy conditions and fog can reduce power generation (by approximately 10-80%); shadows and haze can also reduce the effectiveness of solar power; impact of the sun's latitude (angle of the sun) and need to adjust position of solar capture device for effective capture; must be located outdoors to capture sunshine leaving them at risk of damage from external elements as well as theft; and limitations of solar devices themselves in that they are not rechargeable so must be disposed of at the end of their life.

Metal-air fuel cells, such as magnesium-air fuel cells can also be used as an alternative to traditional batteries. Metal-air fuel cells are considered to offer certain advantages including: high energy density; low price; and long storage potential.

Generally speaking, metal-air fuel cells operate by suspension in an ionic aqueous solution, such as sea water or other saline solutions, which acts as the electrolyte between the air cathode and anode. The air cathode is exposed to oxygen to allow the electrochemical reaction to occur. By-products of this electrochemical reaction include:
a) release of hydrogen gas (and minute amounts of chlorine gas); and
b) waste materials from anode degradation (e.g. metal hydroxides).

Metal-air fuel cell technology is not without its disadvantages, including: leakage of the electrolyte from the cell; exposure of the electrodes to excess electrolyte causing performance interference; sealing problems; gas (e.g. hydrogen and chlorine) build-up and venting issues; dangerous temperature and pressure build up caused by runaway exothermic redox reactions, waste management issues associated with anode degradation (e.g. impaired cathode life caused waste material accumulation within the fuel cell in the absence of regular cleaning and electrolyte replacement).

Magnesium-air fuel cells have a typical lifespan of 50 to 100 hours before requiring replacement of the anode. Performance of the air cathode also often diminishes very rapidly after only 100 to 200 hours of use, or even during storage after initial use. Some metal-air fuel cells require stringent regular maintenance and cleaning activities by the user in order to maximize air cathode life.

Typical metal-air fuel cell configurations are exemplified by: U.S. Pat. No. 3,519,486 (7 Jul. 1970), Huebscher, R. G. et. al.; and U.S. Pat. No. 3,963,519 (15 Jun. 1976), Louie, H. P.

U.S. Pat. No. 3,519,486 describes a trapped electrolyte fuel cell that includes internal reservoir(s)/chamber(s) in the bottom of the cell to capture excess electrolyte. The captured excess electrolyte forms electrolyte pool(s) in which the electrodes and a matrix are positioned. The matrix is made of a material resistant to potassium hydroxide, such as a fibrous asbestos matting (column 2, lines 4-5). The cell must be sealed to prevent leakage of the electrolyte. Further, as the reservoir(s) are positioned in the bottom of the cell, the cell must be positioned in an upright orientation to ensure electrolyte pooling and operation of the cell.

U.S. Pat. No. 3,963,519 describes another trapped electrolyte fuel cell with a protective shield spacer. The spacer provides structural strength to the cell and protects the cathode while permitting air to pass over the entire surface of the cathode. This design was considered an advance over earlier heavy-framed metal/air battery constructions that were considered unsuitable for use as primary and secondary lightweight metal-air cells of AA, C and D cell configurations. A liquid-tight configuration to internally seal the electrolyte is described.

Neither U.S. Pat. No. 3,519,486 nor U.S. Pat. No. 3,963, 519 describes a process for removing or isolating accumulated anode-degradation waste and/or venting by-products to alleviate pressure build-up.

Development of metal-air fuel cell technologies is ongoing. For example Aqua Power System, Japan is presently seeking to advance metal-air fuel cell technology as described in at least the following three PCT patent applications and marketed as their "Realistic Magnesium Air Fuel" (RMAF) system technology (http://aquapowersystems.com/technology/how-aqua-powers-technology-works/, website accessed 19 Dec. 2016).

WO2014/097909 (Aqua Power System, Japan; also published as US2015/0340704 A1), discloses a metal-air fuel cell with a layered cathode body including water repellent and electrically conductive carbon material(s). The resulting fuel cell is described as highly water repellent, air permeable, and leakage resistant.

WO2014/115880 (Aqua Power System, Japan; also published as US2015/0364800 A1), provides a magnesium-air fuel cell with a comparatively shorter distance between the anode and the cathode to improve the electrochemical reaction. The height and width of the fuel cell, relative positioning of the anode and cathode, and use of a water supply pipe further including a reaction gas discharge pipe is said to generate a stable supply of power for a relatively long period of time. However, as the inlet to the reaction gas discharge pipe may be located within the cell, the reaction gas discharge pipe may undesirably leak electrolyte and/or gas.

WO2014/115879 (Aqua Power System, Japan; also published as US2015/0380693 A1), discloses a magnesium-air fuel cell that can be turned on and off by virtue of a lid, that when fastened brings the terminals into contact to switch the power 'on' and when loosened, turns the power 'off.'

RMAF technology is understood to be incorporated into a number of commercial products including a water-activated 1.5V AA battery (http://aquapowersystems.com/products/batteries/, website accessed 19 Dec. 2016) However, as disclosed in the website, the Aqua Power battery is configured as a fixed-sized, closed system which requires manual introduction of the electrolyte via a small, hand-operated pipette.

Fluidic, Inc., (US) is another company presently seeking to advance metal-air fuel cell technology. The Fluidic, Inc., platform technology is understood to be incorporated into the first commercialised rechargeable zinc-air battery (http://fluidicenergy.com/technology/, website accessed 19 Dec. 2016).

Fluidic, Inc., describe various advances in metal-air fuel cell technology including, for example: use of a dopant to increase the conductivity of the metal fuel oxidation product, i.e. the anode is doped degenerately (WO2014/062385, Fluidic, Inc.); use of additives in the ionically conductive medium to enhance electrodeposition and/or extending the cell's capacity (WO2014/160144, Fluidic, Inc.); hetero-ionic aromatic additives (WO2014/160087, Fluidic, Inc.); additives comprising poly(ethylene glycol) tetrahydrofurfuryl; and control of the concentration of additives in the ionic conductive medium (WO2016/123113 and WO2012/030723, Fluidic, Inc.). Other claimed advances resulting from design modifications include: to accommodate a gaseous oxidant receiving space (WO2013/066828, Fluidic. Inc.); a catch tray containing a catalyst material to catalyse the oxidation of waste particulates (WO2012/012364, Fluidic, Inc.); an anode having a scaffolding structure (WO2011/163553, Fluidic, Inc.); a fuel cell having a plurality of electrodes (WO2011/130178 and WO2012/037026, Fluidic, Inc. respectively) and multiple fuel cell systems (WO2011/035176, WO2012/106369 and WO2010/065890, Fluidic, Inc. respectively).

In general, the Fluidic, Inc. metal-air fuel cell technology is akin to conventional rechargeable batteries in that the process is reversible because the anode is not consumed and further that the anode is "doped" or coated to stop it from degrading.

Despite numerous advances in metal-air fuel cell technology, there remains an ongoing need to overcome certain disadvantages associated with the technology and to provide new sources of direct current power particularly in the form of batteries, for use in devices and products which are affordable, accessible, environmentally friendly (re-usable, recyclable), have a long-life (shelf and/or operation), are reliable and safe.

SUMMARY

Throughout this specification and the claims which follow, unless the context requires otherwise, the word "comprise" and variations thereof such as "comprises" and "comprising", will be understood to include the inclusion of a stated integer or step or group of integers or steps but not the exclusion of any other integer or step or groups of integers or steps.

The present invention provides a metal-air fuel cell comprising:
(a) an anode;
(b) a positionable air cathode;
(c) an absorbent material layer adapted to retain electrolyte, the absorbent material layer positioned intermediate the anode and the air cathode such that it contacts the anode; and
(d) an elastic air cathode positioning means adapted to ensure that the air cathode remains in contact with the absorbent material layer while accommodating any change in volume of the absorbent material layer;
wherein the absorbent material layer functions as an ionic transfer bridge between the anode and the cathode by retaining electrolyte.

Preferably the anode, the absorbent material layer and the air cathode are coaxially arranged such that the air cathode substantially surrounds the absorbent material layer and the absorbent material layer substantially surrounds the anode.

Preferably the anode, the absorbent material layer and the air cathode are provided in a laminate or 'sandwich-layered' arrangement such that, for example, the air cathode overlies the absorbent material layer which in turn overlies the anode.

Preferably the elastic air cathode positioning means is positioned around a cross-sectional perimeter of the metal-air fuel cell.

Preferably the elastic air cathode positioning means is either incorporated within or provided separate to the air cathode, and is selected from: an O-ring, a deformable polymeric material, an elastic (or rubber) band or an expandable mesh.

Preferably the metal-air fuel cell is contained within an open housing unit.

Preferably the metal-air fuel cell is activated or re-activated for use by allowing the absorbent material layer to retain electrolyte (e.g. by dipping the metal-air fuel cell in a liquid).

Preferably the absorbent material layer is pre-impregnated with ions to form electrolyte when the absorbent material layer retains water.

Preferably the absorbent material layer comprises a sub-layer of absorbent material that is pre-impregnated with ions, and a sub-layer of absorbent material that is not pre-impregnated with ions.

Preferably the absorbent material layer changes volume upon absorption or depletion of retained electrolyte, and/or capture of anode waste material.

Preferably the absorbent material layer comprises a woven or non-woven fibrous material or a combination thereof. It is further preferred that the absorbent material layer comprises fibrous cellulose, bamboo fibre or a combination thereof.

Preferably the anode comprises a magnesium alloy.

Preferably the air cathode comprises a sheet layer. It is further preferred that the air cathode is hydrophobic, air-permeable and comprises a layered Teflon material.

Preferably the metal-air fuel cell further comprises a paper separator layer located between the absorbent material layer and the air cathode to support and contain the absorbent material layer and/or further isolate and protect the cathode from anode waste precipitates.

In an embodiment the metal-air fuel cell is adapted and/or used to provide a direct current power source for use to power the operation of a product or device. Preferably the product or device is selected from the group consisting of: torches (including flashlights, mag-lights, pen lights); lights and lighting products or devices (including globe lights, LED lights, strobe lights and Christmas lights); safety or temporary lighting applications (including for road works); lanterns (including camping lanterns and Chinese lanterns); combination products (including flashlight-lantern combinations convertible between operation as a flashlight and as a lantern); household products (including electrical toothbrushes and shavers) emergency beacons (including EPIRB and directional finders); radios (analogue and digital); communications equipment (including radios, CB radios and small audio devices); toys (i.e. battery powered), power banks for rechargeable products and recharging docks for USB devices (small electronic products including mobile phones, i-pods, i-pads).

Definitions

Unless otherwise herein defined, the following terms will be understood to have the general meanings which follow.

"Air permeability" means, with respect to a material, one that is capable or has the ability to allow air to flow, diffuse or otherwise pass through it.

"Absorbent" means, with respect to a material, one that is capable or has the ability or tendency to soak up or absorb a fluid (liquid or gas), in particular, a liquid.

"Activate" means, with respect to the metal-air fuel cell of the invention, to make ready (active or operative) for use i.e. to generate electricity through a redox reaction of the metal-air fuel cell.

"Contractible" means, with respect to a material or object, capable of or adapted to decrease in size and/or volume by shrinking or contracting.

"Dipping" means the process of placing or immersing something briefly into a liquid.

"Dry storage" means to process of storing in dry conditions, that is, in a low humidity environment and devoid of atmospheric moisture.

"Elastic" means, with respect to a material or object, one that is capable of or has the ability to resume its original size and shape spontaneously after being stretched or compressed or otherwise deformed.

"Electrolyte" means a solution (liquid or gel, preferably liquid) that comprises ions and is capable of or has the ability to conduct electricity.

"Expandable" means, with respect to a material or object, one that is capable of or adapted to increase in size and/or volume by expansion.

"Hydrophobicity" means, with respect to a material, one that is capable of or has the ability to repel (as opposed to attract or absorb) water.

"Mechanically rechargeable" means, with respect to a fuel-cell or battery, the replacement of the consumed anode, for example, in the case of a magnesium anode, the magnesium material is a storage medium for the electrons that are released during the chemical reaction and the magnesium material is consumed in the process.

"Pressure build-up" means, with respect to gas(es), the build-up of pressure due to gas(es) in a sealed or closed system.

"Shelf-life" means, with respect to a product, the period, length or duration of time for which the product remains usable including fitness for its original purpose.

"Venting" means, with respect to gas(es), the process of releasing gas(es) from a sealed or closed system including for example, via an outlet.

"Waste" means unwanted material or by-product(s) resulting from a process, such as for example in the case of a magnesium metal-air fuel cell, the magnesium hydroxide and/or gases such as hydrogen and chlorine that are produced from the electrochemical reaction in the cell when in use.

"Wicking" means the process of absorbing or drawing a liquid into or through a material by capillary action.

BRIEF DESCRIPTION OF THE FIGURES

The invention is further described with respect to the accompanying figures which illustrate preferred embodiments of a metal-air fuel cell according to the present invention. Other embodiments of the invention are possible, and consequently, the particularity of the accompanying drawings is not to be understood as superseding the generality of the preceding description of the invention.

DETAILED DESCRIPTION

Figure 1A:
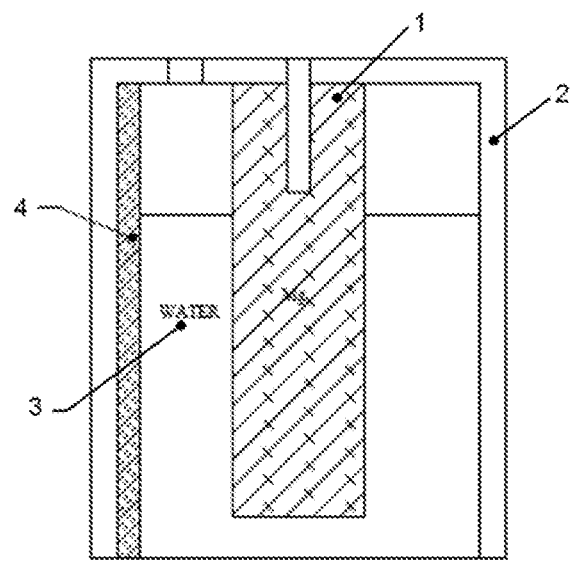
FIG. 1A: Shows a cross-sectional cutaway side view of a traditional magnesium-air ($MgO_2$) fuel cell as known in the art.

FIG. 1A shows a traditional $MgO_2$ cell as known in the art. The $MgO_2$ cell comprises a centrally positioned Mg anode (1) within a closed container (2) containing aqueous electrolyte (3) into which the anode is suspended. Air cathode (4) is incorporated into the outer wall of the container such that an redox reaction with the outside atmosphere can take place resulting in ionic exchanges occurring between the anode and cathode via the electrolyte.

Figure 3A:
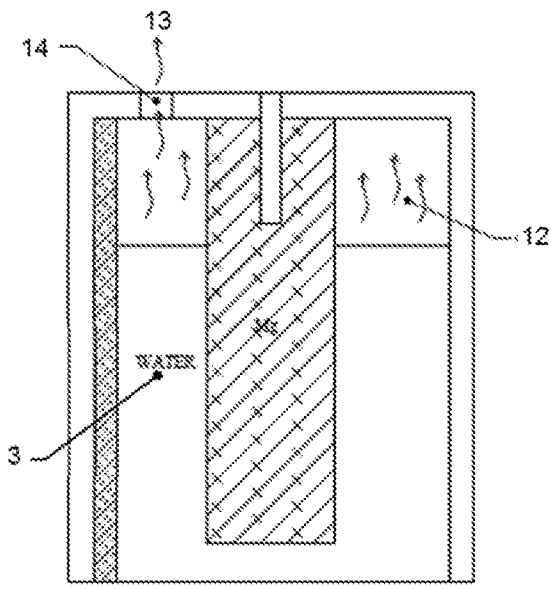
FIG. 3A: Shows a cross-sectional cutaway side view of the traditional $MgO_2$ cell of FIG. 1A to illustrate the cell's gas build-up (fuel-cell reaction by-product) and venting process when in use.

As shown in FIG. 3A, gas by-products generated by the $MgO_2$ cell of FIG. 1A will build up in a void (12) within the closed system. These gas by-products must be vented (13) to the atmosphere through a vent hole (14) which allows the gas to vent but prevents electrolyte (3) leakage.

Figure 4A:
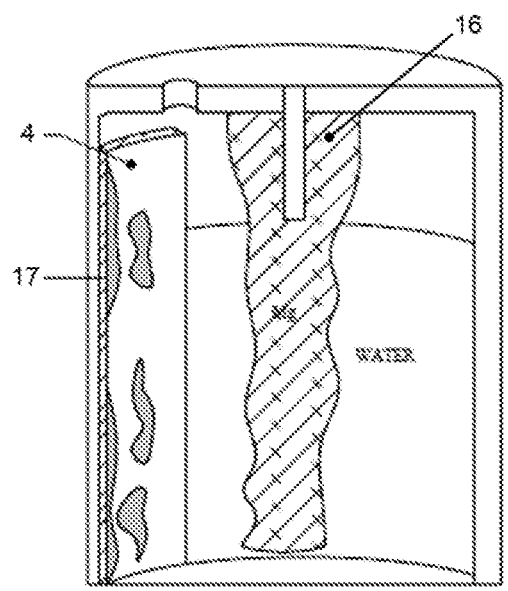
FIG. 4A: Shows a cross-sectional cutaway side view of the $MgO_2$ cell of FIG. 1A, to illustrate build-up of corrosive magnesium anode waste precipitates (fuel-cell reaction by-product) on the cathode from use.

FIG. 4A illustrates degradation of anode (16) of the $MgO_2$ cell of FIG. 1A and corresponding anode waste precipitates (e.g. magnesium hydroxide) build-up (17) on the cathode (4).

Figure 1B:
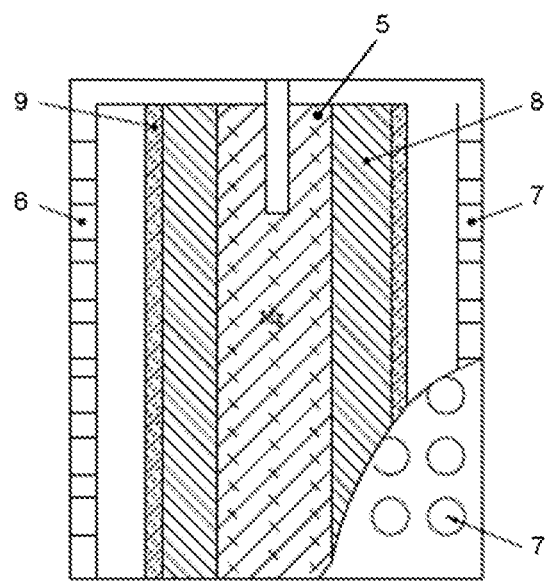
FIG. 1B: Shows a cross-sectional partial cutaway side view of a magnesium-air fuel cell according to an embodiment of the invention.

In contrast to FIG. 1A, FIG. 1B shows a metal-air fuel cell according to an embodiment of the invention in which a magnesium anode (5) is positioned within an open container (6) comprising one or more vents (7) and surrounded by an absorbent material layer (8) which in turn is surrounded by the air cathode (9).

Figure 2:
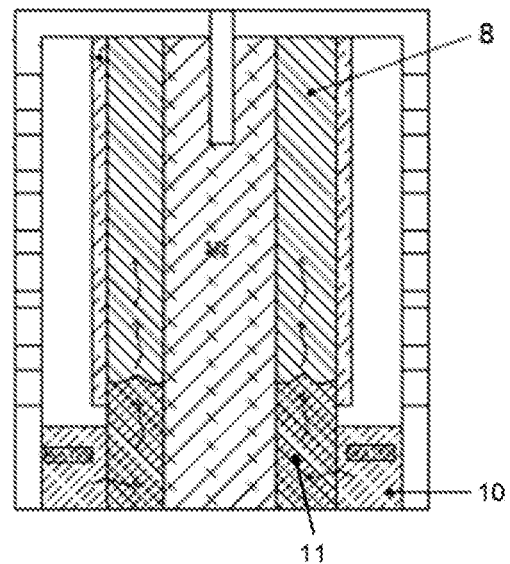
FIG. 2: Shows a cross-sectional cutaway side view of the magnesium-air fuel cell of FIG. 1B to illustrate the uptake (absorption) of the liquid electrolyte (saline) by the absorbent material layer when dipped in liquid electrolyte.

FIG. 2 illustrates uptake of liquid electrolyte (10) by the metal-air fuel cell of FIG. 1B. Electrolyte (10) is absorbed by the absorbent material layer (8) via a wicking action in the direction of arrows (11) when dipped into the electrolyte.

Figure 3B:
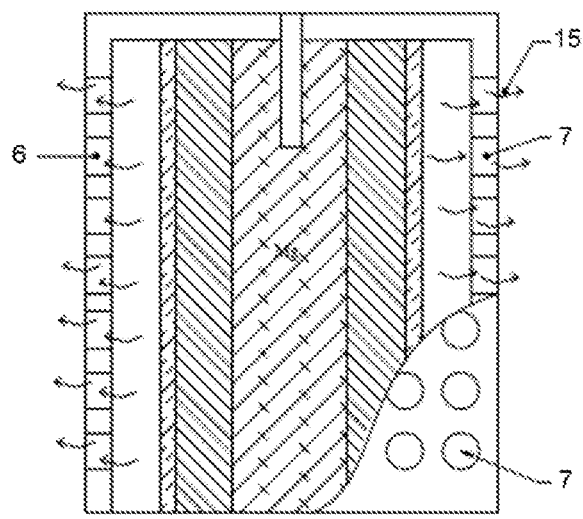
FIG. 3B: Shows a cross-sectional cutaway side view of the metal-air fuel cell of FIG. 1B to illustrate the cell's gas build-up (fuel-cell reaction by-product) and venting process when in use.

As shown in FIG. 3B, the metal-air fuel cell of FIG. 1B provides an open housing unit (6) with vents (7) that allow for gas exchange (including oxygen intake) and venting of the gas by-products in the direction of arrows (15).

While anode (5) is described as a magnesium anode, alternative metals, alloys or combinations of alloys to provide suitable anodes will generally be known to those skilled in the art. Suitable alternative metals include Li, Ca, Al, Zn and Fe. Preferably, the anode comprises a magnesium alloy such as "AZ31B" having the following composition:

Aluminium: 2.5-3.5
Copper: 0.05 max
Iron: 0.005 max
Magnesium: Balance
Manganese: 0.2 min
Nickel: 0.005 max
Silicon: 0.1 max
Zinc: 0.6-1.4

As the anode (5) may be adapted to be internally, preferably centrally, located within the metal-air fuel cell, the anode may generally be formed in the shape of a rod or a cylinder and can be formed through extrusion. Where the metal-air fuel cell is alternatively configured in a sandwich-layered (i.e. laminate) arrangement, the anode, the absorbent material layer and the air cathode may each be provided as a substantially flat layer. This configuration may be particularly desirable in replacing certain rectangular battery shapes such as existing 9V batteries.

Air cathodes (9) that may be suitable for use in the metal-air fuel cell of the invention will generally be known to those skilled in the art. Suitable properties of the air cathode (9) include hydrophobicity and air-permeability. Preferably the air cathode (9) is in the form of a sheet layer adapted to accommodate the change in volume of the absorbent material layer (8) upon expansion and contraction. Preferably the air cathode (9) is hydrophobic and air-permeable and comprises a layered Teflon material. Still more preferably the air cathode (9) may comprise a layered Teflon material, carbon and nickel plated wire.

The absorbent material layer (8) may be a material with properties making it suitable for absorbing and retaining an absorbed amount of electrolyte. The absorbent material layer (8) essentially functions to transport the ions in the absorbed amount of electrolyte between the air cathode and the anode. It is therefore considered to act as an ionic bridging system (or ionic transfer bridge) which is required for operation of the cell.

The absorbent material layer (8) may be made from an absorbent material that is able to absorb and hold or retain electrolyte by a process of wicking, drawing, capillary action, or similar. The absorbent material may be selected based on its possessing one or more of, preferably all of the following properties:

wicking and electrolyte retaining ability;
ability to expand to accommodate an increase in volume due to the absorption of the
liquid electrolyte and/or retention of the anode waste materials;
ability to encapsulate solid particles so as to capture and/or retain the solid waste;
ability to function as an "ionic bridge"; and/or
ability to allow for exchange or diffusion of gases (i.e. for oxygen gas diffusion process and release of gas by-products during operation of the cell).

The absorbent material layer (8) may be made from a combination of air-permeable water absorbing, hydrophilic and/or hydrophobic materials and be conductive or non-conductive. Suitable materials may include woven or non-woven materials or combinations thereof produced from microfiber, rayon, cotton, cotton wool, hemp, wool, hessian, natural fiberwood pulp, aerogel composites, bamboo fibre pulp and/or any suitable combination thereof. Preferably the absorbent material layer comprises fibrous cellulose, bamboo fibre pulp or a combination thereof.

The performance of the absorbent material layer (8) may be enhanced with additives such as, for example, the addition of sphagnum and polyacrylate as well as other super absorbent gels derived from petroleum which will be familiar to those in the art.

The cell may be activated or re-activated for use when the absorbent material layer comprises an absorbed amount of electrolyte. The absorbent material layer (8) may comprise an absorbed amount of electrolyte following absorption of an electrolyte or water (when the absorbent material layer is pre-impregnated with ions). A preferred alternative arrangement of the absorbent material layer is set out and described in relation to FIG. 8, which will be subsequently described in further detail.

The types of electrolyte that may be suitable for use in the metal-air fuel cell of the invention will be generally known to those in the art. Suitable examples may include but are not limited to an aqueous solution comprising ions such as NaCl (e.g. salt water, sea water and saline solutions), electrolytes (e.g. sports drinks), urine and alkaline solutions (e.g. KOH) and water (e.g. when the absorbent material is pre-impregnated with ions).

Figure 4B:
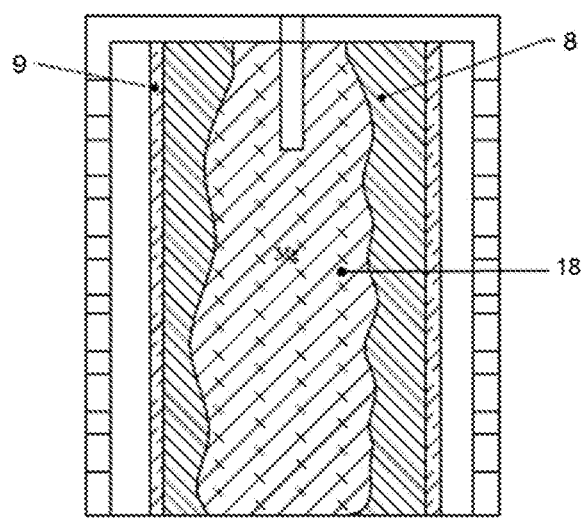
FIG. 4B: Shows a cross-sectional cutaway side view of the metal-air fuel cell of FIG. 1B, to illustrate prevention or reduction of corrosive magnesium anode waste precipitates (fuel-cell reaction by-product) build-up on the cathode from use.
Figure 5A:
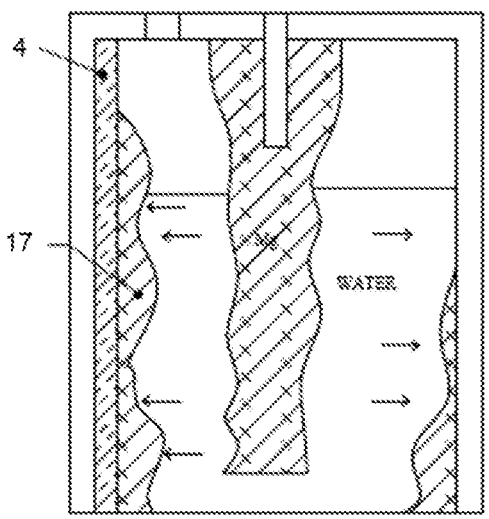
FIG. 5A: Shows a cross-sectional cutaway side view of the $MgO_2$ cell of FIG. 1A, to illustrate the process of deposition and build-up of magnesium anode waste precipitates (fuel-cell reaction by-product) in the cell during use.
Figure 5B:
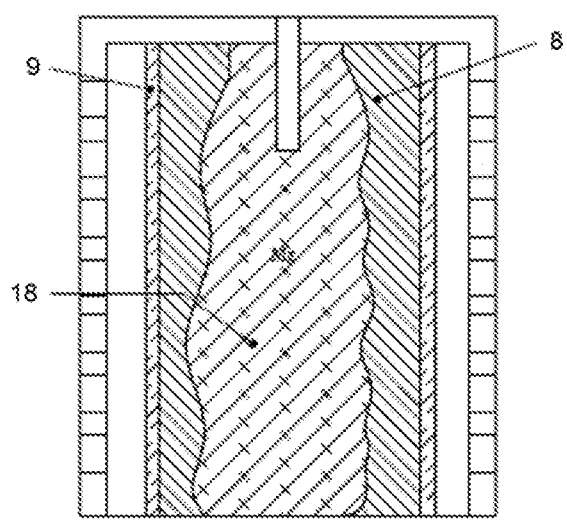
FIG. 5B: Shows a cross-sectional cutaway side view of the metal-air fuel cell of FIG. 1B to illustrate the capture or containment of magnesium anode waste by the absorption material in the cell during use.

As shown in FIG. 4B, anode waste precipitates (18) are captured within the absorbent material layer (8) of the metal-air fuel cell of FIG. 1B and are prevented from making direct contact with the air cathode (9). This process is similarly illustrated in FIGS. 5A and 5B respectively, in which 5A illustrates anode waste precipitates build-up (17) on the cathode (4) of the $MgO_2$ cell of FIG. 1A, while FIG. 5B illustrates capture of anode waste precipitates (18) within the absorbent material layer (8) of the metal-air fuel cell of FIG. 1B.

Figure 6A:
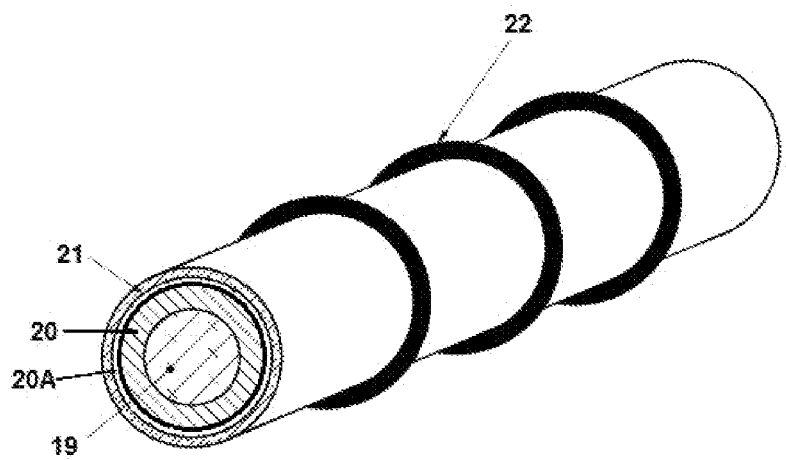
FIG. 6A: Shows a perspective view of a metal-air fuel cell according to the invention to illustrate the concentric layered (co-axial arrangement) construction of the internal anode rod, intermediate absorbent material layer, paper separator layer and external air cathode layer held or positioned in place with an elastic air cathode positioning means (such as an elastic O-ring or mesh) to accommodate expansion (and contraction) of the absorbent material layer upon uptake/absorption (or depletion) of the adsorbed liquid electrolyte and/or collection of anode waste precipitates over time through use.

FIG. 6A presents an metal-air fuel cell according to the invention which provides a co-axial arrangement of internal anode rod (19), substantially surrounded by absorbent material layer (20), which is in turn substantially surrounded by a paper separator layer (20A). The paper separator layer (20A) is in turn substantially surrounded by air cathode layer (21). Air cathode layer (21) is positioned by an elastic air cathode positioning means (22), such as an elastic O-ring or mesh, to retain contact with the absorbent material layer (20). The metal-air fuel cell is therefore able to accommodate expansion (and contraction) of the absorbent material layer upon uptake (or depletion) of the liquid electrolyte and/or collection of anode waste precipitates over time. In an alternative arrangement, the elastic air cathode positioning means could be incorporated into the air cathode layer such as by weaving elastic material into the air cathode.

Figure 6B:
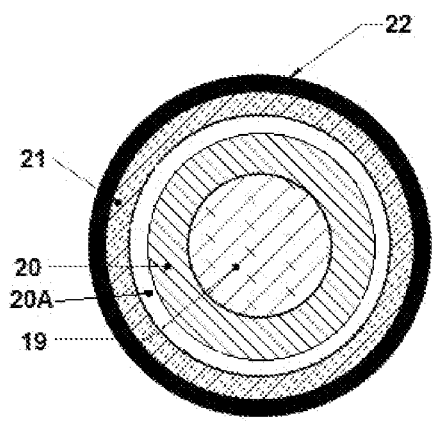
FIG. 6B: Shows a cross-sectional cutaway front view of the fuel cell of FIG. 6A to illustrate the concentric layered (co-axial) construction before expansion of the absorbent material layer.
Figure 6C:
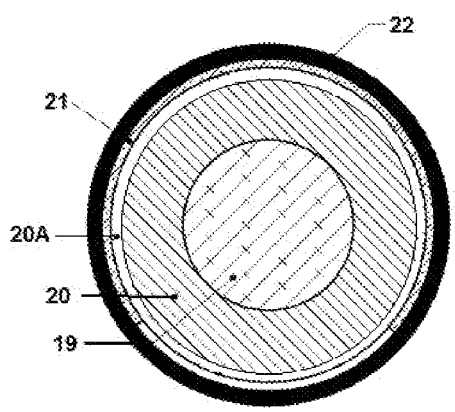
FIG. 6C: Shows a cross-sectional cutaway front view of the fuel cell of FIG. 6A to illustrate the concentric layered (co-axial) construction after expansion of the absorbent material layer.

A cross-sectional view of the fuel cell of FIG. 6A is also presented to illustrate the absorbent material layer (20) before expansion (FIG. 6B) and after expansion (FIG. 6C). As shown in FIGS. 6B and 6C, the air cathode layer (21) remains positioned in contact with the absorbent material layer (20), and paper separator layer (20A), by virtue of the elastic air cathode positioning means.

Figure 7:
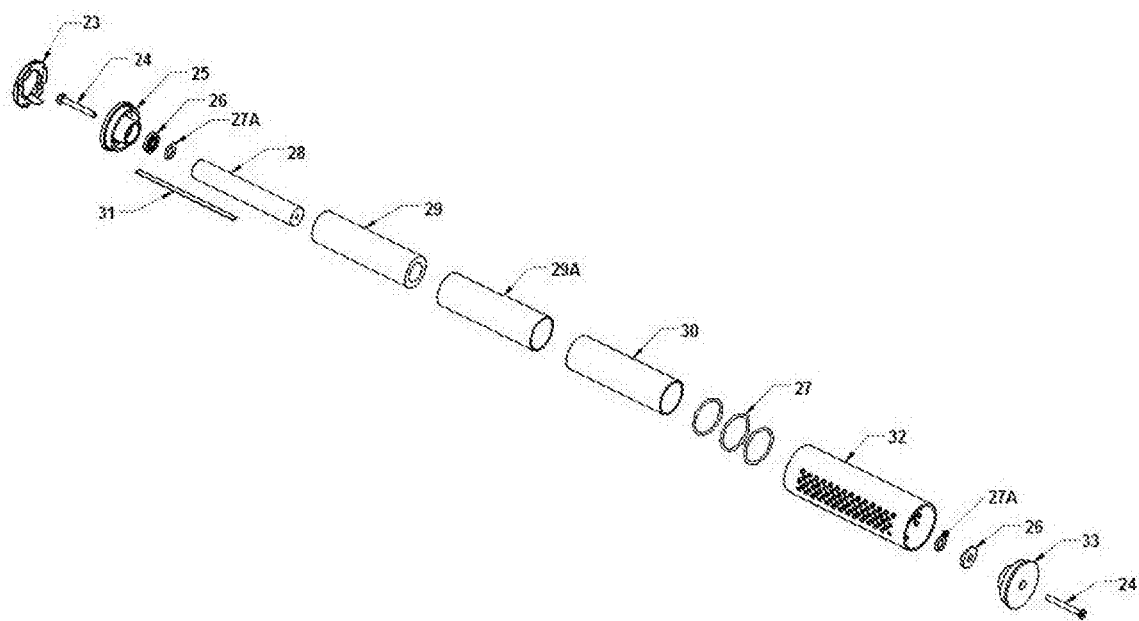
FIG. 7: Shows an exploded view of a magnesium-air fuel cell according to an embodiment of the invention to illustrate its various components.

FIG. 7 shows an exploded view of a metal air fuel cell according to the invention to illustrate some of its various components. Magnesium anode (28), absorbent material layer (29), paper separator layer (29A) and air cathode (30) are co-axially arranged such that the air cathode (30) surrounds the paper separator layer (29A), which surrounds the absorbent material layer (29), which in turn surrounds the magnesium anode (28). Elastic air cathode positioning means (27)—formed of O-rings in the present embodiment—ensure contact between the air cathode (30) and the absorbent material layer (29). The co-axial arrangement of electrodes is positioned within a vented housing (32). The vented housing (32) is closed at respective ends by a top lid (25) and a bottom lid (33), each held in place by a screw (24) secured to the anode (28). A contact ring (23) situated outside the top lid (25) provides a terminal from air cathode (30) and is connected to air cathode (30) by contact tab (31). Rubber or plastic O-rings (27A) and plastic washers (26) seal each end of the electrode arrangement and any electrolyte retained therein from other components to protect against corrosion.

As demonstrated by FIG. 7, components of the metal-air fuel cell may be easily replaced by unscrewing one of the screws (24) holding either the top lid (25) or the bottom lid (33) in place to access the arrangement of electrodes. The magnesium anode (28) (and air cathode (30)) may therefore easily be replaced, providing an energy source that can be mechanically-recharged in a simple manner.

Figure 8:
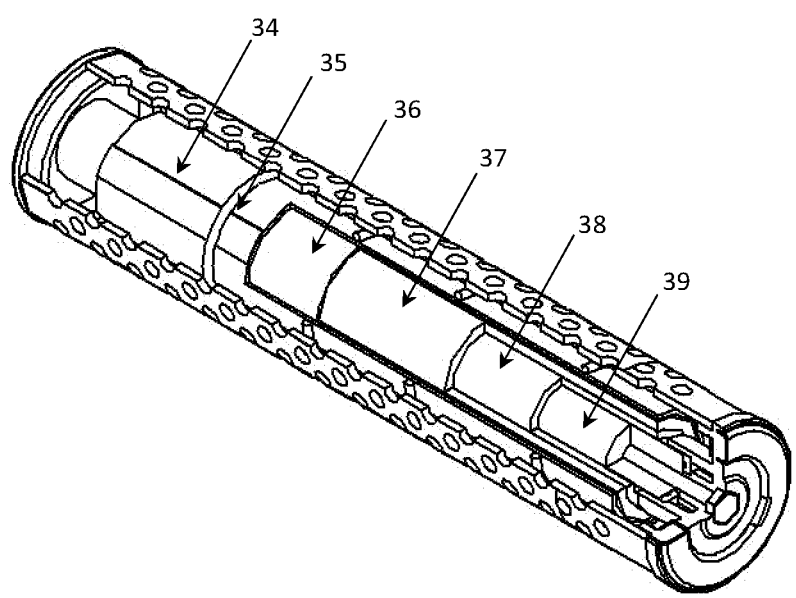
FIG. 8 shows a cross-sectional cutaway front view of a magnesium-air fuel cell to illustrate the absorbent material layer according to an embodiment of the invention.

FIG. 8 shows a cutaway view of a metal-air fuel cell of the invention to illustrate a preferred embodiment of the absorbent material layer. The metal-air fuel cell comprises in sequence moving inward from the outer circumference: air cathode positioning means 35, air cathode 34, paper separator layer 36 to support and contain the absorbent material layer, and further isolate and protect the cathode from anode waste precipitates, pre-impregnated sub-layer 37 of the absorbent material layer (being pre-impregnated with ions), non-impregnated sub-layer 38 of the absorbent material layer (being not pre-impregnated with ions), and anode 39.

According to the preferred embodiment illustrated the configuration of the absorbent material allows for control of the dissolution of ions into the retained electrolyte. This may in turn allow for control of matters such as dissipation or concentration of heat of solution arising when ions are dissolved into solution. This configuration may also allow control over the composition of electrolyte within sub-layers of the absorbent material layer particularly where, for example, pre-impregnated ions have a slow dissolution rate. This may in turn allow control of reaction-rates and temperature within the absorbent material layer and the metal-air fuel cell, noting that the redox reaction between the cathode and anode will typically be exothermic. In this way, higher temperatures caused by runaway redox reactions may be contained within particular zones or sub-layers of the absorbent material layer (e.g. sub-layer 37 as provided in the embodiment shown in FIG. 8) that allow for greater evaporative cooling and resultant reduction in electrolyte content to restrict the runaway redox reaction.

As suggested by the drawings and preceding description, the metal-air fuel cell of the invention advantageously allows for expansion and contraction of the absorbent material layer upon absorption/release of electrolyte and/or capture of anode waste material. Further, potential advantages of the invention may include:

the metal-air fuel cell may be simply and conveniently activated and re-activated on demand by dipping the absorbent material into electrolyte, and deactivated by being allowed to dry out between uses. This provides a metal-air fuel cell with a "dormant" mode in which components are not consumed, and the associated potential for a long shelf-life without any appreciable or significant loss in performance power of the cell;

by providing a novel wicking and retention system for the electrolyte, the invention that may allow for configurations avoiding bulky water vessels and requiring less electrolyte, thereby reducing the weight of the cell while eliminating the potential for electrolyte leakage caused by, for example, tipping the fuel-cell from an upright position;

by providing the metal-air fuel cell in an open housing unit, the invention may overcome disadvantages present in closed metal-air fuel cell systems, such as gas pressure build up and effective sealing of electrolyte, while also improving oxygen intake and venting of by-products;

convenient replacement and recycling of components. The anode, the absorbent material layer, and the air cathode may be simply and conveniently replaced and recycled to provide an environmentally-friendly mechanically rechargeable device; and/or the novel wicking and retention system for the electrolyte may allow for increased thermal control to prevent a runaway exothermic reaction. Metal-air fuel cells work by creating an exothermic redox reaction between the anode and the cathode. In traditional metal-air fuel cells this creates the potential for runaway exothermic reactions, in which pressure and heat within the cell may rise to dangerous levels. The absorbent material layer of the invention allows for improved evaporation and venting of electrolyte as temperatures increase within the cell. This may in turn control runaway reactions by reducing available electrolyte through evaporation, thereby slowing the reaction. Any redox reaction within the cell would completely stop upon full evaporation of the electrolyte.

The metal-air fuel cells of the present application are, depending on their size, considered to potentially provide a power source equivalent to the use of 90-100 traditional AA batteries. This is based on the known electrical storage of the materials in comparison to standard carbon AA dry cell batteries. An AA standard carbon battery has a storage capacity of less than one watt-hour (Wh) of energy (see for example, http://www.allaboutbatteries.com/Energy-tables.html, website accessed 19 Dec. 2016).

TABLE

Energy storage in AA batteries (table reproduced from http://www.allaboutbatteries.com/Energy-tables.html, website accessed 19 Dec. 2016)

| Battery Type | Avg. voltage during discharge | Milli-Amp hours (mAh) | Watt-hours Wh | Joules J |
|---|---|---|---|---|
| Alkaline Long-life | 1.225 | 2122 | 2.60 | 9360 |
| Carbon-zinc | 1.1 | 591 | 0.65 | 2340 |
| Nickel-Cadmium | 1.2 | 1000 | 1.20 | 4320 |
| NiMH | 1.2 | 2100 | 2.52 | 9072 |
| Lithium Ion | 3.6 | 853 | 3.1 | 11050 |

The magnesium alloy used has a storage capacity of one watt-hour (Wh) for every gram of material by weight. Accordingly, a 50 g magnesium alloy rod provides a potential 50 watt hours or storage whereas a heavier or larger magnesium rod, for example 150 grams provides 150 watt-hours of storage. The reference for Magnesium Galvanic Energy Density is as follows.

| Metal-Air Types | Magnesium | Aluminium | Zinc |
|---|---|---|---|
| Specific Gravity | 1.74 | 2.70 | 7.13 |
| SHE | −2.363 | −1.662 | −0.763 |
| Energy # electrons | 2 | 3 | 2 |
| Open circuit voltage | 1.7 | 1.2 | 1.3 |
| Anode composition | >90% | 99.999% | 99.99% |
| Current capacity Ah/kg | 2200 | 2500 (alloy) | 740 |
| Electrolyte | Salt water | KOH | KOH |
| pH electrolyte | 6-8 | 13-14 | 13-14 |

EXAMPLES

To test performance of the metal-air fuel cells according to the invention, a series of experiments were conducted using prototype cells constructed in accordance with the invention. In Experiment 1 prototype cells were tested alone. In Experiments 2 and 3, prototype cells were tested against a traditional $MgO_2$ fuel cell constructed substantially in accordance with FIGS. 1A, 3A and 4A.

Experiment Parameters

Identical anode and cathode materials were used in all tests.

Magnesium Anode

An extruded magnesium AZ31B rod (anode) having the following composition resulting in a magnesium anode composition of approximately (typically) 96% pure magnesium:

Aluminium: 2.5-3.5
Copper: 0.05 max
Iron: 0.005 max
Magnesium: Balance
Manganese: 0.2 min
Nickel: 0.005 max
Silicon: 0.1 max
Zinc: 0.6-1.4

Air Cathode

An air cathode with sufficient hydrophobicity, consisting of layered Teflon material, carbon and nickel plated wire.

Configuration of traditional $MgO_2$ Fuel Cell

The traditional $MgO_2$ cell was of commonly understood configuration such that the magnesium anode was contained within a vessel of 5% saline water solution electrolyte, and the air cathode formed part of the vessel wall structure.

Configuration of Prototype Cells

The prototype cells consisted of a 45 gram magnesium anode and an air cathode consisting of layered Teflon material, carbon and nickel plated wire. The anode was encapsulated in an absorbent material (woven cotton material rolled and woven into a mat-like substance). The air cathode was wrapped around the absorbent material and secured with elastic O-rings to allow for expansion.

Test Methodology

Electronic measurements were conducted using hand-held multimeters, of well-known voltage and amperage measurement accuracy (typically well within 1%) and stored in a climate-controlled environment. The instruments were allowed to warm up before measurements commenced.

The tests were conducted on a 24-hour basis in a climate controlled laboratory with typically 65% humidity and a constant air temperature of 25 degrees Celsius. The traditional $MgO_2$ cells were maintained by carefully emptying and replacing the saline electrolyte every 24 hours, while the prototype cells were dipped, for approximately 10 seconds, in the same saline solution every 24 hours.

An electronic load in the form of a high-efficiency DC to DC converter circuit powering 3 LEDs was used. This circuit was specifically designed to maximize load on the cells at all times, whilst maximizing brightness of the LEDs.

Experiment 1: Improvement in Lifetime and Performance of Metal-Air Fuel Cell (or Endurance Testing)

The experiment was conducted using three identically constructed prototype cells labelled as Cell 1, Cell 2 and Cell 3. The target was to generate at least 250 milliamps at over 1.2 volts (under constant electrical load) for 250 hours (the claimed run time in products).

Cell 1 and Cell 2 had a continuous electrical load (i.e. 24 hours per day) while control Cell 3 ran for four (4) hours per day under electrical load.

The voltage of each cell was not recorded daily but on a regular random basis. All cells maintained over 1.2V for the duration of the test and typically between 1.3V and 1.65V.

Results

Figure 9:
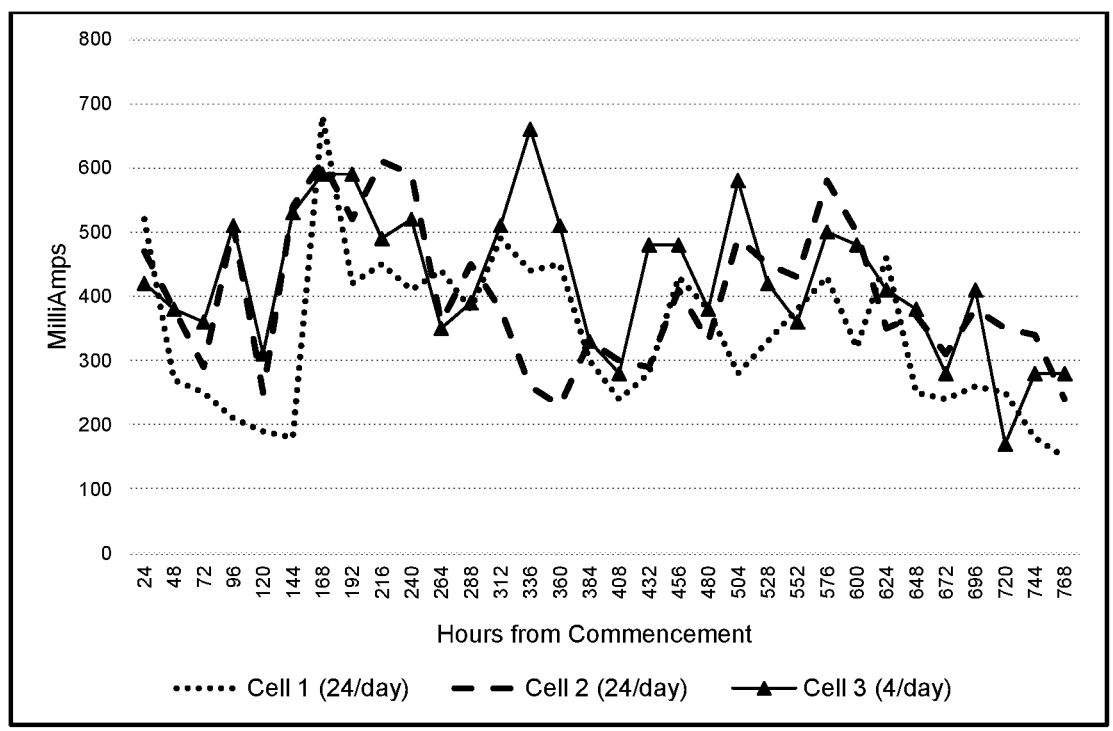
FIG. 9: Presents the endurance (milliAmps) test results for prototype Cells 1, 2 and 3 according to an embodiment of the invention over approximately 750 hours (Example 1, Experiment 1).

The results are presented in Table 1 below and FIG. 9.

TABLE 1

Endurance testing results (milliAmps) of Cells 1, 2 and 3 according to an embodiment of the invention over approximately 750 hours

| Hours | Cell 1 (24/day) MilliAmps | Cell 2 (24/day) MilliAmps | Cell 3 (4/day) MilliAmps |
|---|---|---|---|
| 24 | 520 | 470 | 420 |
| 48 | 270 | 380 | 380 |
| 72 | 250 | 290 | 360 |
| 96 | 210 | 510 | 510 |
| 120 | 190 | 250 | 310 |
| 144 | 180 | 540 | 530 |
| 168 | 680 | 610 | 590 |
| 192 | 420 | 520 | 590 |
| 216 | 450 | 610 | 490 |
| 240 | 410 | 590 | 520 |
| 264 | 440 | 360 | 350 |
| 288 | 380 | 450 | 390 |
| 312 | 490 | 380 | 510 |
| 336 | 440 | 260 | 660 |
| 360 | 450 | 230 | 510 |
| 384 | 300 | 330 | 330 |
| 408 | 240 | 300 | 280 |
| 432 | 280 | 290 | 480 |
| 456 | 430 | 410 | 480 |
| 480 | 380 | 330 | 380 |
| 504 | 280 | 490 | 580 |
| 528 | 330 | 450 | 420 |
| 552 | 380 | 430 | 360 |
| 576 | 430 | 580 | 500 |
| 600 | 320 | 500 | 480 |
| 624 | 460 | 350 | 410 |
| 648 | 250 | 370 | 380 |
| 672 | 240 | 310 | 280 |
| 696 | 260 | 380 | 410 |
| 720 | 250 | 350 | 170 |
| 744 | 180 | 340 | 280 |
| 768 | 150 | 240 | 280 |

The results show that the prototype cells exceeded the 250 milliamp target threshold after 264 hours, as follows:

Cell 1: 440 mA
Cell 2: 360 mA
Cell 3: 350 mA

The test duration was extended and after 504 hours, again the 250 mA threshold was still exceeded as follows:

Cell 1: 280 mA
Cell 2: 490 mA
Cell 3: 580 mA

Cells 2 and 3 continued to show improved performance.

At the 740-hour mark, two of the three cells still exceeded the 250 mA target power output threshold, as follows:

Cell 1: 180 mA
Cell 2: 340 mA
Cell 3: 280 mA

After several repeated experiments with similar observations and results it was concluded that the cells exceeded lifecycle endurance expectations (i.e. the 250 mA target) by a factor of three.

Based on these results, it is anticipated that the cells would, in most applications perform for at least 250 hours and in many cases in excess of 500 hours with a satisfactorily or target power output of above 250 mA and 1.2 volts.

Experiment 2: Improvement in Lifetime and Performance of Cathode

In order to test the lifetime and performance of the cathode, a comparative experiment was conducted using identically constructed prototype cells (labelled as Prototype Cell 1 and Prototype Cell 2) and identically constructed traditional $MgO_2$ cells (labelled as Traditional Cell 1 and Traditional Cell 2).

Results

Figure 10:
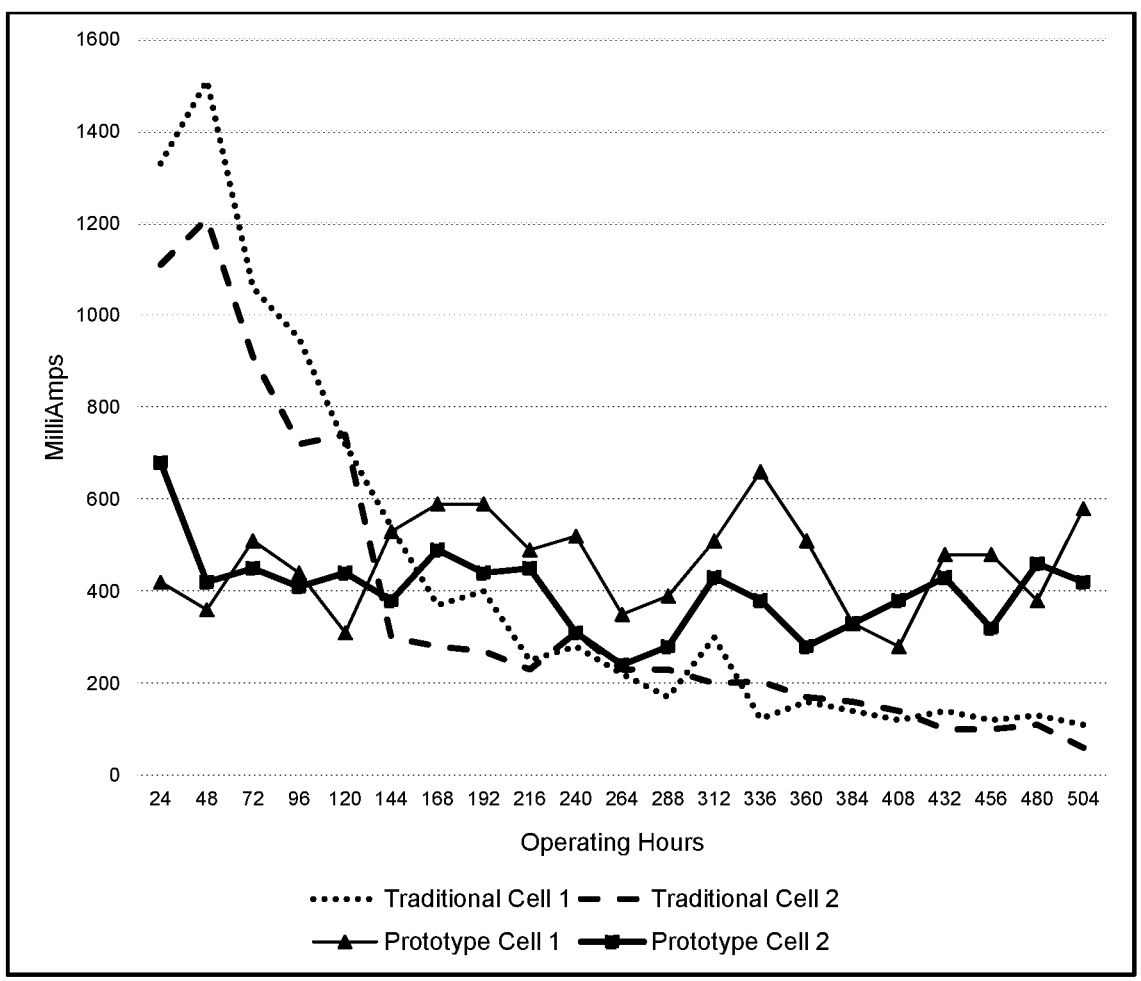
FIG. 10: Presents the comparative power output (milliAmps) test results for a traditional $MgO_2$ cell and a prototype cell according to an embodiment of the invention over approximately 500 operating hours (Example 1, Experiment 2).

The results are presented in Table 2 below and FIG. 10.

TABLE 2

Comparative power output (milliAmps) of a traditional $MgO_2$ cell and a prototype cell according to an embodiment of the invention over approximately 500 operating hours

| Hours | Traditional Cell 1 Power Output (mA) | Traditional Cell 2 Power Output (mA) | Prototype Cell 1 Power Output (mA) | Prototype Cell 2 Power Output (mA) |
|---|---|---|---|---|
| 24 | 1330 | 1110 | 420 | 680 |
| 48 | 1510 | 1210 | 360 | 420 |

TABLE 2-continued

Comparative power output (milliAmps) of a traditional MgO$_2$ cell and a prototype cell according to an embodiment of the invention over approximately 500 operating hours

| Hours | Traditional Cell 1 Power Output (mA) | Traditional Cell 2 Power Output (mA) | Prototype Cell 1 Power Output (mA) | Prototype Cell 2 Power Output (mA) |
|---|---|---|---|---|
| 72 | 1060 | 910 | 510 | 450 |
| 96 | 950 | 720 | 440 | 410 |
| 120 | 720 | 740 | 310 | 440 |
| 144 | 540 | 300 | 530 | 380 |
| 168 | 370 | 280 | 590 | 490 |
| 192 | 400 | 270 | 590 | 440 |
| 216 | 250 | 230 | 490 | 450 |
| 240 | 280 | 310 | 520 | 310 |
| 264 | 220 | 230 | 350 | 240 |
| 288 | 170 | 230 | 390 | 280 |
| 312 | 300 | 200 | 510 | 430 |
| 336 | 123 | 204 | 660 | 380 |
| 360 | 160 | 170 | 510 | 280 |
| 384 | 140 | 160 | 330 | 330 |
| 408 | 120 | 140 | 280 | 380 |
| 432 | 140 | 100 | 480 | 430 |
| 456 | 120 | 100 | 480 | 320 |
| 480 | 130 | 110 | 380 | 460 |
| 504 | 110 | 60 | 580 | 420 |

The results show that the MgO$_2$ traditional cell, after a commonly observed initial first-activation power peak, rapidly declined in electrical performance, and then subsequently continued to degrade at a steady pace. After 500 hours of continuous operation the traditional MgO$_2$ cells failed to generate more than 10% of the original initial electrical power output.

In comparison, after 500 hours of continuous operation, the prototype cell was able to maintain over 70% of the original electrical power output in one instance and over 100% of the output in another—clearly showing power output improvement well over the initial first-activation output.

It is well-known that the pores of air cathodes in Mg-Air cells become increasingly blocked by precipitates that form during discharge and consumption of magnesium (e.g. magnesium hydroxide precipitates). This in turn negatively affects oxygen gas diffusion such that the reaction diminishes, degrading the air-cathode performance over time. The microstructure and air-permeability of carbon-based air-cathode materials is thus a critical factor that affects the electrochemical performance of MgO$_2$ cells.

Upon review, the air-cathodes of the traditional MgO$_2$ cells were completely degraded, covered in a solid white material (solidified magnesium hydroxide) and were also observed to be badly corroded and therefore no longer useable.

In comparison, the air cathodes in the prototype cells appeared normal and were re-used for future experiments with little or no loss of performance.

After several repeated experiments with identical observations and identical results it was concluded that, in contrast to traditional MgO$_2$ cell configuration, the prototype cells demonstrated improved lifetime and performance of the cathode.

Experiment 3: Improvement in performance of metal-air fuel cell associated with waste accumulation in the absorbent material layer A series of experiments and tests were performed to characterise the benefits and effectiveness of the waste management system incorporated into the cells of the present application.

The absorbent material layer for each cell tested according to an embodiment of the invention comprised of a fibrous cellulose/bamboo material having a similar consistency to female sanitary products. The expandable, anode-encapsulating absorbent material layer functioned to provide an "ionic bridge" between the anode and cathode after dipping into an electrolyte solution (salt water) in order to initiate and sustain the ionic reaction which may last up to several days. As demonstrated by the following results, the ionic exchange process was observed to improve in the cell over time with the accumulation of anode waste material (magnesium hydroxide) generated as a by-product of the reaction.

Results

Figure 11:
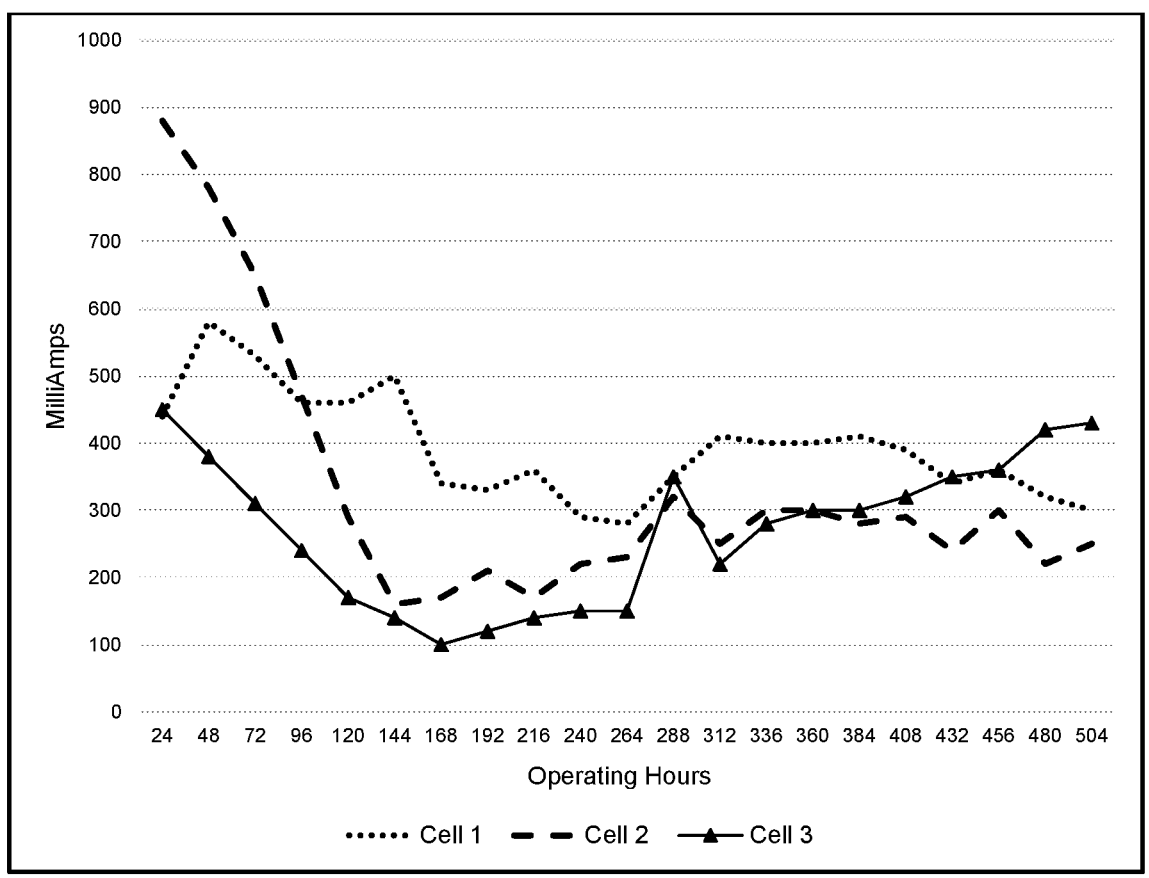
FIG. 11: Presents the performance testing results (milliAmps) of prototype Cells 1, 2 and 3 according to an embodiment of the invention over approximately 500 hours (Example 1, Experiment 3).

The results are presented in Table 3 below and FIG. 11.

TABLE 3

Performance testing results (milliAmps) of Cells 1, 2 and 3 according to an embodiment of the invention over approximately 500 hours

| Hours | Cell 1 (mA) | Cell 2 (mA) | Cell 3 (mA) |
|---|---|---|---|
| 24 | 440 | 880 | 450 |
| 48 | 580 | 780 | 380 |
| 72 | 530 | 650 | 310 |
| 96 | 460 | 470 | 240 |
| 120 | 460 | 290 | 170 |
| 144 | 500 | 160 | 140 |
| 168 | 340 | 170 | 100 |
| 192 | 330 | 210 | 120 |
| 216 | 360 | 170 | 140 |
| 240 | 290 | 220 | 150 |
| 264 | 280 | 230 | 150 |
| 288 | 350 | 320 | 350 |
| 312 | 410 | 250 | 220 |
| 336 | 400 | 300 | 280 |
| 360 | 400 | 300 | 300 |
| 384 | 410 | 280 | 300 |
| 408 | 390 | 290 | 320 |
| 432 | 340 | 240 | 350 |
| 456 | 360 | 300 | 360 |
| 480 | 320 | 220 | 420 |
| 504 | 300 | 250 | 430 |

The results show that as the magnesium hydroxide "waste" accumulates, the electrical performance (electrical output) of the cells actually improved until the magnesium anode material was fully consumed. This is evident from the 100-hour mark onwards in all performed tests. That is, once the initial drop in power has stabilized, the results show that the cell output subsequently progressively improves and as a result, the electrical performance (power output) increases.

Without wishing to be bound by theory, the inventors believe that this unexpected phenomenon may take place as a result of any or all of the following:

anode waste captured over time within the absorbent material layer provides better conductive or ionic paths to enhance the reaction;
 as the cell expands during accumulation of waste, more electrolyte is adsorbed by the absorbent material and made available for reaction;
 the surface area of the cell where the reaction is taking place is increased allowing for increased reaction; and/or
 the pores of the air cathode are protected from magnesium hydroxide precipitates so that oxygen gas diffusion is not significantly impaired.

Based on the results of the experiments and observations, it was considered that, the unique design, engineering and operation of metal-air fuel cells according to the invention allows for filtering and/or capturing anode waste precipitates within the absorbent material, which in turn:

protects pores found within the air-cathode from blockage by waste particulates, in turn allowing for critical oxygen gas diffusion across the air cathode;
 effectively prevent the waste precipitates otherwise degrading the air-cathode; through salt ingress or corrosion (e.g. salt migration due to "salt creep" i.e. salt crystal migration resulting in salt ingress and/or corrosion), potentially also improving the life of the cathode and other cell components such as contacts, wiring and/or electronics;
 render regular internal cleaning of the cell to remove accumulated waste unnecessary; and/or
 may actually enhance the performance of the cell as the waste precipitates collect or are captured within the absorbent material.

Metal-air fuel cells according to the invention may offer an affordable, low-cost power source for use in the developing world. It is anticipated that such metal-air fuel could provide approximately five (5) hours of light usage per day for less that the cost of 0.05 USD/day in the first year (including the initial cost of device). This would reduce in subsequent years to 0.01 USD/day. It is further noted that all constituent parts are exchangeable and replaceable (being ideal for third-world applications) and the entire cell is inherently safe as even short circuits have no detrimental effects other than the consumption of the anode metal.

Metal-air fuel cells according to the invention may therefore provide to provide a portable, light-weight (i.e. light and sturdy unit construction that avoids bulky water vessels and/or containers), eco-friendly, exchangeable, powerful (i.e. may be powerful enough to drive a myriad of electrical and electrical applications not previously possible with certain known metal-air fuel cells), scalable and miniaturised direct current generator (i.e. may be miniaturised to be used in "classic" previously battery dominated areas such as D-cells and other battery only form factors); and/or to offer the potential of an environmentally friendly, or "green", power source for products and devices (when compared to, for example, traditional batteries, solar and kerosene as the constituent parts are eco-friendly and commonly available allowing for excellent recyclability of the entire device, the cathode itself is also removable and suitable for recycling.

Modifications and variations as would be deemed obvious to the person skilled in the art are included within the ambit of the present invention as claimed in the appended claims.

What is claimed is:

1. A metal-air fuel cell comprising:
 (a) an anode;
 (b) an air cathode;
 (c) an absorbent material layer configured to retain electrolyte, the absorbent material layer positioned intermediate the anode and the air cathode such that it contacts the anode; and
 (d) an elastic air cathode positioning means configured to position the air cathode to ensure that the air cathode remains in contact with the absorbent material layer while accommodating any change in volume of the absorbent material layer; wherein the absorbent material layer functions as an ionic transfer bridge between the anode and the cathode by retaining electrolyte.

2. The metal-air fuel cell according to claim 1, wherein the anode, the absorbent material layer and the air cathode are coaxially arranged such that the air cathode substantially surrounds the absorbent material layer and the absorbent material layer substantially surrounds the anode.

3. The metal-air fuel cell according to claim 1, wherein the anode, the absorbent material layer and the air cathode are provided in a laminate arrangement.

4. The metal-air fuel cell according to claim 1, wherein the elastic air cathode positioning means is positioned around a cross-sectional perimeter of the cell.

5. The metal-air fuel cell according to claim 1, wherein the elastic air cathode positioning means is either incorporated within or provided separate to the air cathode, and is selected from: an O-ring, a deformable polymeric material, an elastic (or rubber) band or an expandable mesh.

6. The metal-air fuel cell according to claim 1, wherein the metal-air fuel cell is contained within an open housing unit.

7. The metal-air fuel cell according to claim 1, wherein the metal-air fuel cell is activated or re-activated for use by allowing the absorbent material layer to retain electrolyte.

8. The metal-air fuel cell according to claim 1, wherein the absorbent material layer is pre-impregnated with ions and configured to form electrolyte when the absorbent material layer retains water.

9. The metal-air fuel cell according to claim 1, wherein the absorbent material layer comprises a first absorbent material sub-layer pre-impregnated with ions and a second absorbent material sub-layer not pre-impregnated with ions.

10. The metal-air fuel cell according to claim 1, wherein the metal-air fuel cell is configured to be activated or re-activated for use by dipping the metal-air fuel cell in a liquid so as to retain electrolyte.

11. The metal-air fuel cell according to claim 1, wherein the absorbent material layer changes volume upon adsorption or depletion of retained electrolyte or water, and/or capture of anode waste material.

12. The metal-air fuel cell according to claim 1, wherein the adsorbent material layer comprises a woven or nonwoven fibrous material or a combination thereof.

13. The metal-air fuel cell according to claim 1, wherein the adsorbent material layer comprises fibrous cellulose, bamboo fiber or a combination thereof.

14. The metal-air fuel cell according to claim 1, wherein the anode comprises a magnesium alloy.

15. The metal-air fuel cell according to claim 1, wherein the air cathode comprises a sheet layer.

16. The metal-air fuel cell according to claim 1, wherein the air cathode is hydrophobic, air-permeable and comprises a layered polytetrafluoroethene material.

17. The metal-air fuel cell according to claim 1, wherein the metal-air fuel cell further comprises a paper separator layer located between the absorbent material layer and the air cathode to support and contain the absorbent material layer and/or further isolate and protect the cathode from anode waste precipitates captured in the absorbent material layer.

18. A method comprising:
providing a direct current from a metal-air fuel cell according to claim 1.

19. The method of claim 18 further comprising powering a device with the direct current from the group consisting of: torches; lights and lighting products or devices; safety or temporary lighting applications; lanterns; combination products; household products; emergency beacons; radios; communications equipment; battery-powered toys; and power banks for rechargeable products and recharging docks for USB devices.

20. The method of claim 19, wherein the device is a torch, a light, a lighting product, a lighting device, a safety or temporary lighting application, a lantern, a combination product, a household product, an emergency beacon, a radio, communications equipment, a battery-powered toy, a power bank for rechargeable products, or a recharging dock for USB devices.

* * * * *